No. 706,882. Patented Aug. 12, 1902.
M. F. BATES.
AUTOMOBILE.
(Application filed June 14, 1902.)
(No Model.)
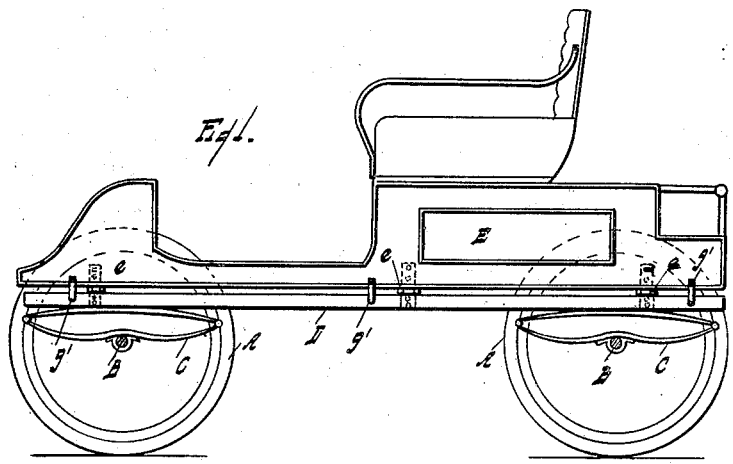
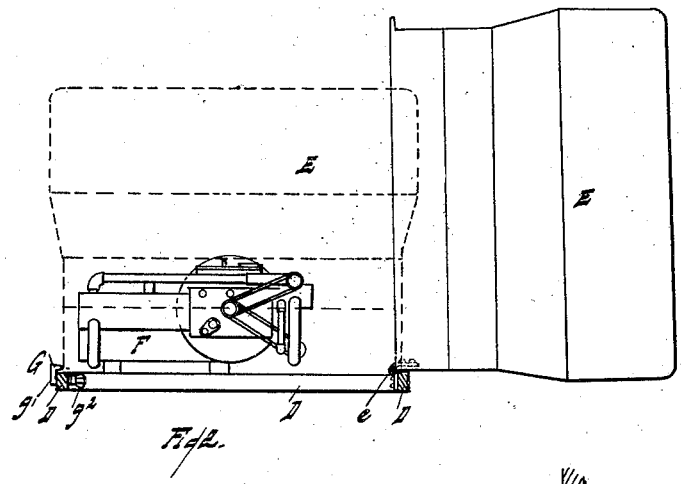
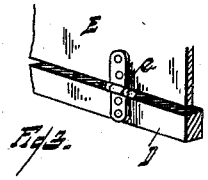
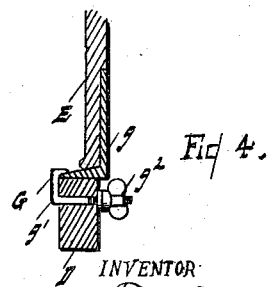
WITNESSES
Lotta Lee Hayton.
J. J. Massey
INVENTOR
Madison F. Bates
By Parker & Burton Attorneys.
THE NORRIS PETERS CO., PHOTO-LITHO., WASHINGTON, D. C.

UNITED STATES PATENT OFFICE.

MADISON F. BATES, OF LANSING, MICHIGAN.

AUTOMOBILE.

SPECIFICATION forming part of Letters Patent No. 706,882, dated August 12, 1902.

Application filed June 14, 1902. Serial No. 111,612. (No model.)

*To all whom it may concern:*

Be it known that I, MADISON F. BATES, a citizen of the United States, residing at Lansing, county of Ingham, State of Michigan, have invented a certain new and useful Improvement in Automobiles; and I declare the following to be a full, clear, and exact description of the invention, such as will enable others skilled in the art to which it pertains to make and use the same, reference being had to the accompanying drawings, which form a part of this specification.

My invention relates to automobiles; and the object of my improvements is to make the operating machinery more conveniently accessible for examination, regulation, or repair.

In the self-propelled vehicle the operating mechanism is generally covered and partially inclosed by the body. This mechanism is liable to get out of order in some small particulars that may be readily set right when discovered. In almost every instance the time and trouble expended in this way are due to the difficulty of locating the trouble and not to the difficulty of setting it right. The accessibility of the parts is therefore one of the most important desideratums in this kind of apparatus, and it is desirable that the whole actuating mechanism shall be visible at once. Various devices are in use for facilitating the accessibility of the various separate parts.

The object of this invention is to provide a simple and convenient way for rendering the whole actuating mechanism accessible and open to view at once.

Referring to the accompanying drawings, Figure 1 is a side view of a self-propelled vehicle embodying my invention. Fig. 2 is a rear elevation, partly in section, of the same, the wheels, axles, and springs being omitted and the body being shown turned to a position at which the actuating mechanism is exposed to view. Fig. 3 is a detail of a part of one side of the vehicle-body, an adjacent part of the running-gear, and the pivotal connection between the two. Fig. 4 is a detail sectional view showing the apparatus for securing the unpivoted edge of the vehicle-box to the frame.

A A are the wheels, B B the axles, and C C the springs, of the vehicle.

D is a frame secured to the springs C C.

The parts A, B, C, and D constitute the running-gear of the vehicle.

F is a driving mechanism—for instance, a gasolene-engine—which is secured to the frame D above the same.

E is the vehicle-box, which is inclosed at the top, sides, and ends and is opened at the bottom. The box E in its normal position covers and incloses the driving mechanism F. One side of the box E at its lower edge is pivotally secured by hinges $e$ to the side of the frame D. In its normal position the other side of the box E is firmly clamped to the other side of the frame D. This clamping may be accomplished by the device shown in Fig. 4, in which G G indicates the clamping device as a whole.

$g$ is an iron secured to the side of the box E and extending horizontally outward at its lower edge in an extension the lower surface of which is plain and horizontal and the upper surface inclined.

$g'$ is a hooked bolt extending through the side of the frame, provided with screw-threads at its inner end with which the threads of a nut or nuts $g^2$ engage. The bill of the hook $g'$ engages against the inclined surface of the iron $g$.

In Fig. 2 the body is shown in dotted lines in its normal position, in which it covers and incloses the driving mechanism, and in full lines turned backward around the pivoting-hinges $e$, leaving the whole driving mechanism from end to end of the vehicle exposed to view and in a position to be readily got at by the operator. The body is quite light and may easily be turned back with one motion, leaving the entire driving mechanism exposed.

What I claim is—

1. In a self-propelled vehicle, the combination of the running-gear, driving mechanism secured upon said running-gear, and a body pivoted at one side at one side of said running-gear, substantially as and for the purpose described.

2. In a self-propelled vehicle, the combination of the running-gear, driving mechanism secured upon said running-gear, a body pivoted at one side at one side of said running-gear, and means for detachably securing the unpivoted edge of said body to said running-gear, substantially as and for the purpose described.

In testimony whereof I sign this specification in the presence of two witnesses.

MADISON F. BATES.

Witnesses:
J. EDWARD ROE,
N. T. CAMPBELL.